J. L. BLICKENSTAFF & J. H. WERKING.
AUTOMATIC MASKING DEVICE.
APPLICATION FILED JULY 24, 1916.
1,235,100.
Patented July 31, 1917.
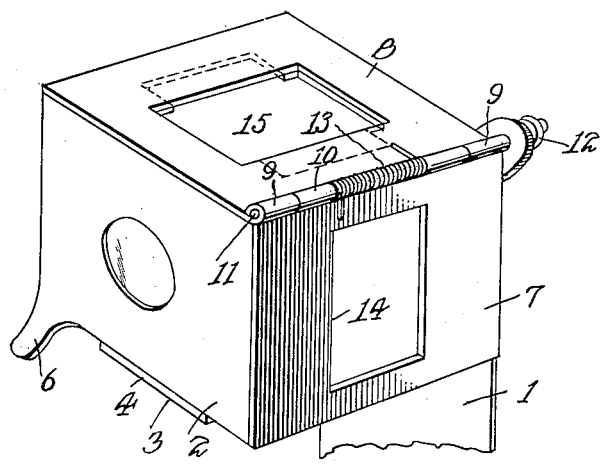
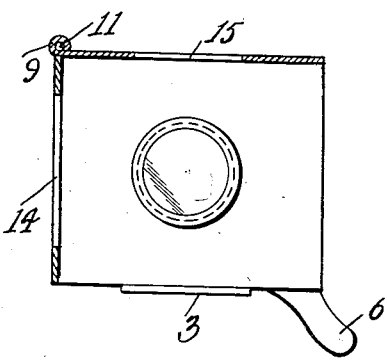
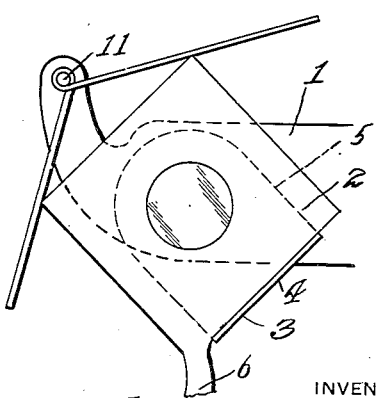
WITNESSES
INVENTORS
Jesse L. Blickenstaff
and
Joshua H. Werking.
BY
ATTORNEY

UNITED STATES PATENT OFFICE.

JESSE L. BLICKENSTAFF AND JOSHUA H. WERKING, OF NORTH MANCHESTER, INDIANA.

AUTOMATIC MASKING DEVICE.

1,235,100.  Specification of Letters Patent.  Patented July 31, 1917.

Application filed July 24, 1916. Serial No. 111,001.

*To all whom it may concern:*

Be it known that we, JESSE L. BLICKENSTAFF and JOSHUA H. WERKING, citizens of the United States, residing at North Manchester, in the county of Wabash and State of Indiana, have invented certain new and useful Improvements in Automatic Masking Devices, of which the following is a specification.

This invention has relation to view finders for cameras, and the nature and objects thereof will be readily apparent to those familiar with the art to which it appertains, in the light of the following explanation of the accompanying drawings, illustrating what we now believe to be the preferred embodiment or mechanical expression of our invention, from among other forms and arrangements within the spirit thereof, and the scope of the appended claims.

However, an object of the invention is to provide a view finder which may be reversed, that is to be rotated about an axis drawn through the lens when the position of the camera is changed to take a picture lengthwise of the sensitive medium or transversely thereto, thus obviating the necessity of more than one view finder.

Another object of the invention is to provide means to be associated with a view finder having the above named characteristics, for masking the focusing plate of the finder, so as to define an opening through which the screen is viewed, the configuration of the opening being changed to correspond with the position of the camera, and having its sides proportioned to correspond to the proportions of the sensitive medium.

In addition to the foregoing, our invention comprehends improvements in the details of construction and arrangement of parts, to be hereinafter described and particularly set forth in the appended claims.

In the accompanying drawings, in which similar and corresponding parts are designated by the same characters of reference throughout the several views in which they appear:

Figure 1 is a view in perspective of a view finder constructed in accordance with our invention.

Fig. 2 is a view thereof in front elevation, and

Fig. 3 is a similar view illustrating the view finder in the act of being shifted from one position to another.

With reference to the drawings, 1 indicates a support which may form a part of a camera in which the present invention is embodied, and 2 the view finder supported in a clip 3 having a member 4 which extends beneath the view finder, and a portion 5 bent at right angles to the member 4 and secured to the back of the view finder. The member 5 is pivotally connected to the support at a point on the member 5 in alinement with the center of the lens of the finder. The front of the finder is formed with a finger piece 6 by which the finder may be rotated about its axis relatively to its support.

Masking members 7 and 8 are hingedly connected together at one of their edges, the material being rolled to permit the formation of interengaging lugs 9 and 10 respectively. A pintle 11 is passed through said lugs and through the support 1, the pintle having an enlargement 12 to prevent withdrawal thereof from the support. The inner lugs are spaced to permit the interposition of a coil spring 13 which encompasses the pintle 11 at that point, the terminals of the spring engaging the members 7 and 8 to urge them toward each other. In this manner the leaves 7 and 8 are closely engaged upon adjacent side faces of the view finder.

The leaves 7 and 8 are provided each with openings 14 and 15 respectively, said openings being proportioned to correspond with the proportions of the plate or film used in the camera embodying the view finder, the openings are however arranged relatively at right angles to each other.

The use of the device is as follows: In Fig. 1, the finder is positioned with the focusing screen thereof (indicated in dotted lines), thereby placing it beneath the opening 15. Evidently in this position the picture will be taken vertically upon the sensitive medium, and the objects visible within the opening 15 will appear on the picture. To take a picture with the camera held so as to dispose the longitudinal dimension of the film horizontally, the view finder is rotated through an angular distance of 90°, whereupon the focusing screen will be disposed behind the opening 14. The view outlined by said opening will then correspond to the position of the objects as they will occur on the finished picture. It will be noted that as the finder is rotated, the leaves 7 and 8 will be separated and disposed in oblique relation against the tension of the spring 13, but will correctly adjust themselves to engage the sides of the finder when the same is entirely moved to its adjusted position.

While we have illustrated and described our invention with some degree of particularity, we realize that in practice various alterations thereover may be made, and we therefore reserve the right and privilege of changing the form of the details of construction, or otherwise altering the arrangement of the correlated parts without departing from the spirit of the invention or the scope of the appended claims.

Having thus fully described our invention what we claim as new and desire to secure by Letters Patent is:—

1. The combination of a support, a view finder of the box type pivotally mounted upon the support for rotation about the axis of the lens of the finder, and a masking device associated with the finder to present a different aperture for each position of the finder through which the screen may be viewed.

2. The combination of a support, a view finder of the box type pivotally mounted upon the support for rotation about the axis of the finder lens, and a masking device having a plurality of apertures, whereby the finder may be rotated so as to dispose its screen behind either of the apertures.

3. The combination of a support, a view finder of the box type pivotally mounted upon the support for rotation about the axis of the finder lens, and a masking device comprising movable leaves adapted to engage adjacent sides of the finder and having an aperture in each leaf whereby the finder may be rotated to dispose its focusing screen behind either of the openings.

4. The combination of a support, a view finder of the box type pivotally mounted upon the support for rotation about the axis of the finder lens, and a masking device comprising movable leaves hingedly connected together at one of their edges and adapted to each engage adjacent sides of the finder, each leaf having an aperture, and resilient means for urging the leaves into such engagement, whereby the finder may be rotated to position its focusing screen behind either of the apertures, the leaves separating against the tension of the spring during rotation of the finder.

5. The combination of a support, a view finder of the box type pivotally mounted upon the support for rotation about the axis of the finder lens, a pintle fixedly mounted upon the support and adapted to lie in contiguous relation to one edge of the finder, relatively movable leaves hingedly connected to the pintle and adapted to normally rest against two adjacent surfaces of the finder and a coil spring encircled about the pintle and engaging at its end the leaves to retain them in such engagement, said leaves having apertures whereby the finder may be rotated to present its observation plate under any one of the leaves.

In testimony whereof we affix our signatures in presence of two witnesses.

JESSE L. BLICKENSTAFF.
JOSHUA H. WERKING.

Witnesses:
ERVIN WEAVER,
LOUISE LAUTZENHISER.